US008726403B2

(12) United States Patent
Huang et al.

(10) Patent No.: US 8,726,403 B2
(45) Date of Patent: May 13, 2014

(54) SECURE VIDEO CONTENT PROVISIONING USING DIGITAL RIGHTS MANAGEMENT

(75) Inventors: Jian Huang, Sudbury, MA (US); Bobby Bo Xiao, Irving, TX (US); Jack Jianxiu Hao, Lexington, MA (US); Diego S. Rozensztejn, Brookline, MA (US); Okeno R. Palmer, Woburn, MA (US); Gaurav Mehta, Brookline, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 404 days.

(21) Appl. No.: 12/874,541

(22) Filed: Sep. 2, 2010

(65) Prior Publication Data

US 2012/0060031 A1     Mar. 8, 2012

(51) Int. Cl.
*G06F 7/04*      (2006.01)
*G06F 17/30*     (2006.01)
*G06F 21/00*     (2013.01)

(52) U.S. Cl.
USPC ........ 726/27; 726/5; 726/26; 726/28; 726/29; 726/31; 380/201; 380/202; 713/150; 713/156; 713/157; 713/168; 725/25; 725/31; 725/93; 725/132; 705/52; 705/57; 705/59

(58) Field of Classification Search
USPC ........ 726/5, 26, 27, 28, 29, 31; 713/150, 156, 713/157, 168; 380/201, 202; 725/25, 31, 725/93, 132; 705/52, 57, 59
See application file for complete search history.

(56) References Cited

U.S. PATENT DOCUMENTS

| 7,493,289 | B2* | 2/2009 | Verosub et al. | 705/51 |
|---|---|---|---|---|
| 8,131,646 | B2* | 3/2012 | Kocher et al. | 705/54 |
| 2002/0042780 | A1* | 4/2002 | Yang | 705/56 |
| 2003/0167392 | A1* | 9/2003 | Fransdonk | 713/156 |
| 2003/0220881 | A1* | 11/2003 | Pirhonen et al. | 705/53 |
| 2004/0205028 | A1* | 10/2004 | Verosub et al. | 705/59 |
| 2006/0089912 | A1 | 4/2006 | Spagna et al. | |
| 2006/0173787 | A1 | 8/2006 | Weber et al. | |
| 2006/0236344 | A1* | 10/2006 | Brain et al. | 725/61 |

(Continued)

OTHER PUBLICATIONS

Ashkenazi, A.; Akselrod, D.; Amon, Y., "Platform Independent Overall Security Architecture in Multi-Processor System-on-Chip ICs for Use in Mobile Phones and Handheld Devices," Automation Congress, 2006. WAC '06. World , vol., No., pp. 1,8, Jul. 24-26, 2006.*

(Continued)

*Primary Examiner* — Yin-Chen Shaw
*Assistant Examiner* — Kari Schmidt

(57) ABSTRACT

A method that includes receiving a first request for video content from a user of a user device; retrieving an identifier for the user device using an application programming interface; sending a second request to receive the video content that includes the identifier; receiving an instruction to provide payment to rent or purchase the video content; sending the payment in response to the instruction; receiving the video content and a token, where the video content is encrypted based on a key and where the token indicates that the payment was processed; sending a third request to obtain a license associated with the video content that includes the token and the identifier; receiving the license, which includes the key and terms under which the video content is to be processed; decrypting the video content, using the key, when the decrypting is performed in a manner permitted by the terms; and playing the decrypted video content.

24 Claims, 7 Drawing Sheets

(56) References Cited

U.S. PATENT DOCUMENTS

| | | | |
|---|---|---|---|
| 2007/0271191 A1* | 11/2007 | Torrubia-Saez | 705/59 |
| 2009/0113116 A1 | 4/2009 | Thompson et al. | |
| 2010/0042747 A1 | 2/2010 | Hascalovici et al. | |
| 2010/0064378 A1* | 3/2010 | Hwang et al. | 726/29 |
| 2010/0114782 A1 | 5/2010 | Candelore | |
| 2011/0154382 A1* | 6/2011 | Chow et al. | 725/5 |
| 2011/0197057 A1* | 8/2011 | Koch | 713/150 |
| 2011/0247079 A1* | 10/2011 | Candelore | 726/27 |

OTHER PUBLICATIONS

Messerges, Thomas S., and Ezzat A. Dabbish. "Digital rights management in a 3G mobile phone and beyond." Proceedings of the 3rd ACM workshop on Digital rights management. ACM, 2003.*

Dutta, et al., "Key Management in Multi-Distributor based DRM System with Mobile Clients using IBE", Aug. 6, 2009 IEEE, Retrieved online Dec. 29, 2011 at <http://eprints.nuim.ie/2311/1/RD_KeyManagement.pdf>, Aug. 6, 2009.

* cited by examiner

SECURE VIDEO CONTENT PROVISIONING USING DIGITAL RIGHTS MANAGEMENT

BACKGROUND

Computing and communication devices are capable of performing an increasing variety of functions and tasks that continue to improve the user's experience. Computing and communication devices can run a variety of applications, can connect to a variety of wired and wireless networks, can perform point of sale transactions to purchase goods and/or services, and/or can download content, which can be stored and/or displayed on the computing and communicating devices. Unfortunately, downloaded content, intended for a particular device, can be copied and/or transmitted to another device even when the other device has not purchased the downloaded content or is not authorized to receive the downloaded content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that provide secure video content provisioning using digital rights management (DRM) that enables video content to be purchased, downloaded, and/or displayed on different types of user devices in a secure manner. As described herein, a user device may use a mobile DRM application to purchase video content and/or to download the purchased video content. The user device may use the mobile DRM application to obtain a license associated with the downloaded video content and may use the license to decrypt the video content for display on the user device. Secure video content provisioning using DRM may permit video content to be purchased by, downloaded to, and/or displayed on a user device in a manner that does not permit the video content to be copied and/or displayed on another user device if the other user device did not pay for the video content and/or is not authorized to receive and/or process the video content.

Figure 1:
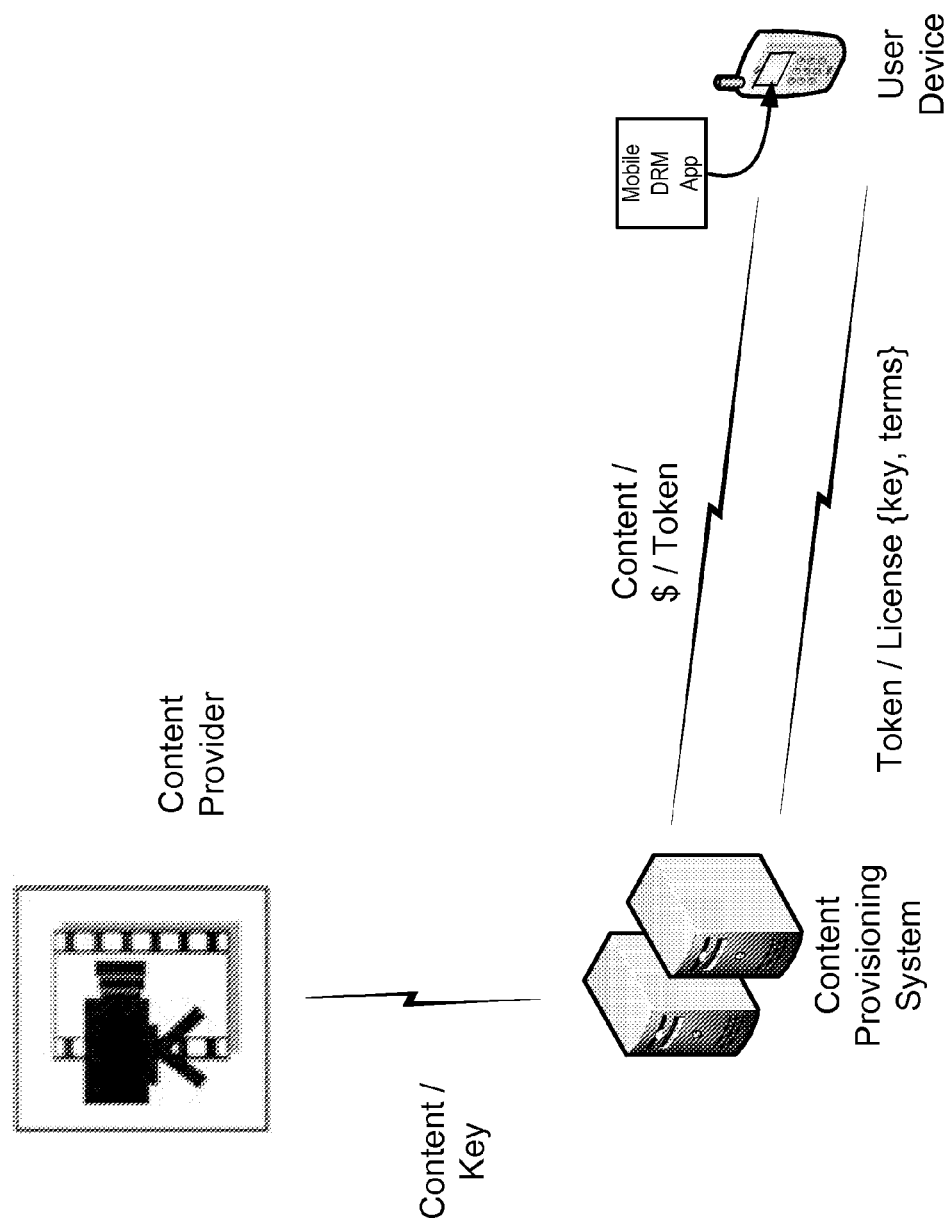
FIG. 1 is a diagram that illustrates an overview of a secure video content provisioning using digital rights management according to an implementation described herein.

FIG. 1 is a diagram that illustrates an overview of a secure video content provisioning using DRM according to an implementation described herein. As illustrated in FIG. 1, a content provider may provide video content to a content provisioning system. For example, the content provider may use a key to encrypt video content in a manner that does not permit the video content to be viewed, displayed and/or copied by another device (e.g., by a user device, a server device, and/or some other device) unless the other device has the key that can be used to decrypt the video content. The content provider may also transcode the video content in a manner that enables different types or brands of user devices to view the video content that has been decrypted. In one example, the video content may be transcoded in a manner that permits a particular type of user device (e.g., a DROID®) to view the video content. In another example, the video content provider may transcode the video content in a manner that permits another type of user device (e.g., an iPhone®, a Resource In Motion (RIM) user device, etc.) to view the video content. The content provisioning system may receive the encrypted and/or transcoded video content from the video content provider and may store the video content in a storage device associated with the content provisioning system. Additionally, or alternatively, the content provisioning system may store a copy of a key (e.g., obtained at a prior point in time from the content provider) that may be used to decrypt video content that is received from the content provider in an encrypted state.

As also shown in FIG. 1, a user device may communicate with the content provisioning system to receive video content for display on the user device. For example, a user of the user device may desire to view particular video content and may use a mobile DRM application, hosted on the user device, to request that the particular video content be downloaded to the user device. In one example, the user device may send a request, to the content provisioning system, to purchase the particular video content. The request may include payment information (e.g., a credit card number, an expiration date, etc.), information associated with the user, and/or information associated with the user device. In another example, the user may send a request to rent the particular video content for a period of time, a particular quantity of viewings, and/or to preview a sample of the video content prior to purchasing and/or renting the video content.

The content provisioning system may receive the request and may send transcoded and/or encrypted video content to the user device in response to the request. The video content may include a token, associated with the video content, that indicates that the payment information was processed. The user device may receive the encrypted video content and the token and the mobile DRM application may retrieve information associated with the user device (e.g., a device identifier, such as a mobile equipment identifier (MEID), an international mobile equipment identifier (IMEI), an Internet protocol (IP) address, and/or other device identifiers and/or addresses) in a manner that does not permit the information associated with the user device to be accessed, changed, and/or forged by a user of the user device or a user of another user device.

The mobile DRM application, hosted by the user device, may communicate with a license server, associated with the content provisioning system, to obtain a license to process and/or play the video content. The mobile DRM application may, for example, send the token and/or the information associated with the user device to the license server. The license server may, for example, use the token to determine the terms by which the video content was obtained by the user device (e.g., whether the video content was purchased, rented, etc.). Additionally, or alternatively, the license server may, for example, use the information associated with the user device to authenticate the user device. Based on the determination of the terms and/or the authentication of the user device, the license server may generate a license that includes the terms by which the video content was obtained and/or a key that may be used, by the user device, to decrypt the video content. The license may be configured in a manner that does not permit another user device, that is different than the user device, to use and/or decrypt the video content. Additionally, or alternatively, the license server may send the license to the user device to be used to decrypt and/or play the video content.

The mobile DRM application may use the license to decrypt the video content and/or to play the video content. For example, the mobile DRM application may use the key, obtained from the license, to decrypt the video content in order to play the video content on the user device. The license may, for example, include terms and/or rules by which the video content may be played, based on the prior purchase, rental, subscription, trial period, etc. of the video content. In one example, the license may permit the video content to be played a particular quantity of times and/or over a particular period of time. In another example, the license may permit the video content to be played one time (e.g., pay-per-view), an unlimited quantity of times, and/or over an unlimited period of time based on a prior purchase of the video content.

Figure 2:
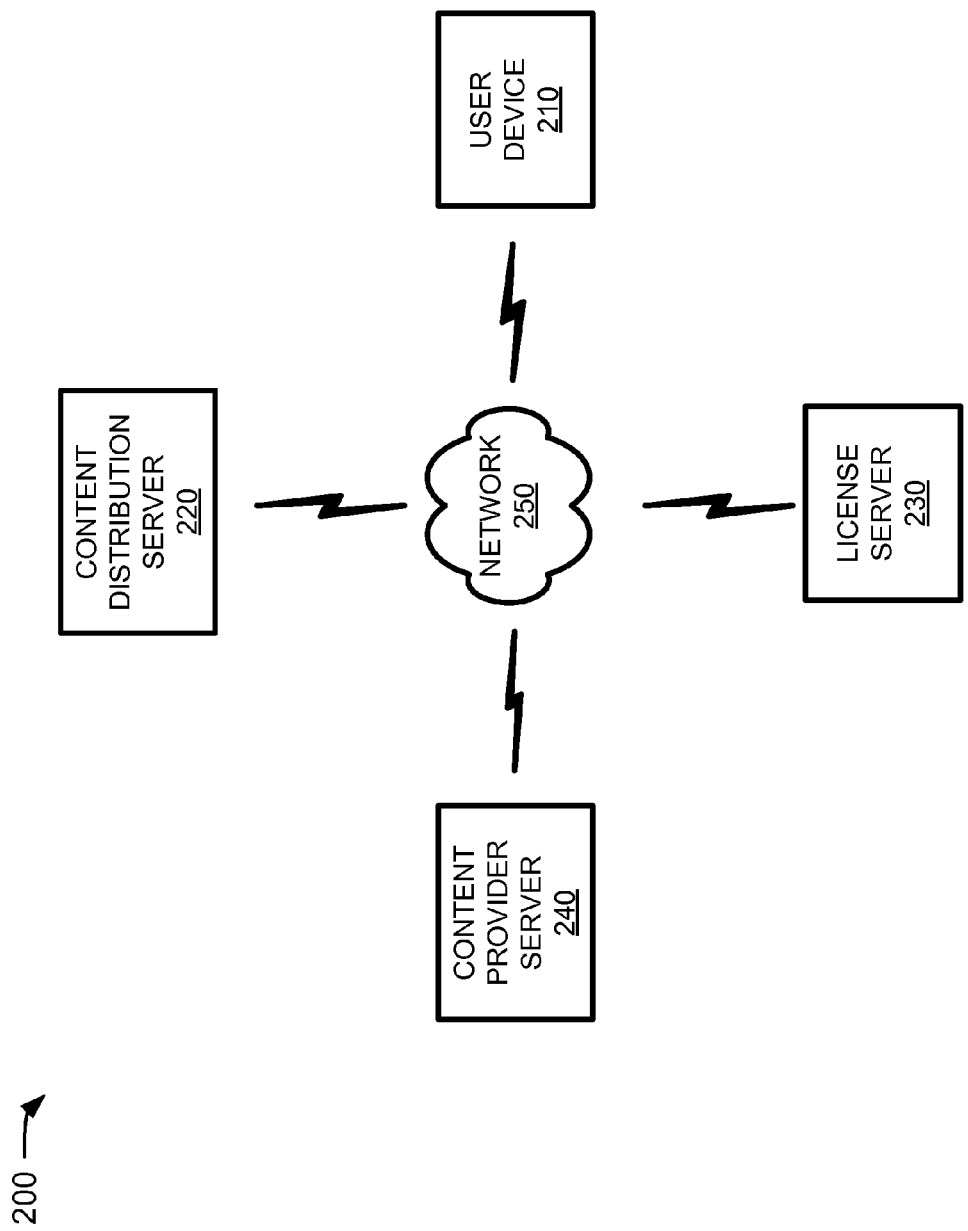
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a user device 210, a content distribution server 220, a license server 230, and a content provider server 240 interconnected by a network 250. The number of devices and/or networks, illustrated in FIG. 2, is provided for explanatory purposes only. In practice, there may be additional networks and/or devices, fewer networks and/or devices, different networks and/or devices, or differently arranged networks and/or devices than illustrated in FIG. 2.

Also, in some implementations, one or more of the devices of network 200 may perform one or more functions described as being performed by another one or more of the devices of network 200. For example, content distribution server 220, license server 230, and/or content provider server 240 may be integrated into a single device. Components of network 200 may interconnect via wired connections, wireless connections, or a combination of wired and wireless connections.

User device 210 may include any computation or communication device, such as a wireless mobile communication device that is capable of communicating with network 250. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a camera, a personal gaming system, or another type of computation or communication device. In one example implementation, user device 210 may receive, process, store (e.g., in a memory associated with user device 210), and/or play video content. In another example implementation, user device 210 may host a mobile DRM application and may use the mobile DRM application to receive video content, to obtain a license to play video content, to decrypt video content, to encrypt video content, and/or to play decrypted video content based on terms of a license associated with the video content.

User device 210 may download a copy of a mobile DRM application from content distribution server 220 (e.g., and/or some other device associated with network 200) and may register the downloaded mobile DRM application with content distribution server 220. For example, user device 210 may receive the mobile DRM application and may install and/or store the mobile DRM application in a memory associated with user device 210. The mobile DRM application may, for example, use an application programming interface (API) (e.g., an original equipment manufacturer (OEM) API, etc.), that corresponds to a type and/or brand of user device 210, to obtain information associated with user device 210. The information associated with user device 210 may include a unique address associated with user device 210 (e.g., a media access control (MAC) address, an IP address, a uniform resource locator (URL), etc.) and/or a unique device identifier (e.g., a MEID, an IMEI, a mobile directory number (MDN), an international mobile subscriber identity (IMSI), an electronic serial number (ESN), a universal integrated circuit card (UICC) identifier, a mobile identification number (MIN), a mobile subscriber integrated services digital network (MSISDN) number, a national access identifier (NAI), an encoder-decoder (CODEC) number, a STB identifier, etc).

User device 210 may send information associated with the mobile DRM application (e.g., an application identifier) and/or the information associated with user device 210 to content distribution server 220 to register the mobile DRM application and/or user device 210.

User device 210 may download video content from content distribution server 220. For example, a user of user device 210 may use the mobile DRM application to request video content from content distribution server 220. The request may include information associated with the video content (e.g., a video content identifier, title, etc.) and/or the information associated with user device 210. User device 210 may send payment information to content distribution server 220 in order to purchase the video content, to rent and/or lease the video content (e.g., for a particular period of time, for a particular quantity of viewings, etc.), to purchase for one-time viewing (e.g., pay-per-view), etc. User device 210 may receive encrypted video content and/or a token from content distribution server 220. For example, the encrypted video content may not permit user device 210 to play and/or copy the video content, and/or to send the video content to another user device 210. The token may, for example, indicate that the payment information was processed by content distribution server 220. In another example, the token may indicate that the video content is authorized to be previewed (e.g., for a particular period of time) before payment information is to be obtained from user device 210.

User device 210 may communicate with license server 230 to obtain a license associated with video content downloaded from content distribution server 220. For example, user device 210 may send a request to license server 230 for a license with which the video content can be processed (e.g., received, decrypted, etc.) and/or played by user device 210. The request may include the token, information associated with the video content, and/or information associated with user device 210. User device 210 may receive a license from license server 230 that includes a key associated with the information associated with the user device. The mobile DRM application may use the token to decrypt the video content and/or to play the video content. In another example, the mobile DRM application may use a key (e.g., an OEM key), associated with a type or brand of user device 210 that hosts the mobile DRM application, to encrypt the video content (e.g., the video content that was decrypted using the key obtained from the license) in order for user device 210 to play the video content.

The description to follow will generally refer to user device 210 as a wireless mobile communication device. The description is not limited, however, to a wireless mobile communication device and may equally apply to other types of user devices.

Content distribution server 220 may include one or more server devices, or other types of computation or communication devices, that gather, process, search, store, and/or provide information in a manner similar to that described herein. Content distribution server 220 may communicate via network 250. In one example, content distribution server 220 may receive encrypted and/or transcoded video content from content provider server 240 and may store the video content in a memory associated with content distribution server 220. Content distribution server 220 may use a key (e.g., a provider key), obtained at a prior point in time from content provider server 240, to decrypt video content received from content provider server 240. In another example, content distribution server 220 may receive a video content identifier (e.g., a content ID), associated with the video content, received from content provider server 240 and/or another key (e.g., a seed key) obtained from content provider server 240, at a prior point in time, to generate the provider key.

Content distribution server 220 may process a request (e.g., from user device 210) for video content that may include determining the type of user device 210 (e.g., a mobile wireless device, a PDA, a laptop computer, etc.), a brand of user device 210 (e.g., iPhone, DROID, etc.), etc., from which the request was received. Based on the determination, content distribution server 220 may retrieve particular transcoded video content that a particular user device 210 (e.g., a particular type and/or brand of user device 210) can receive, process and/or play.

Content distribution server 220 may process point of sale transactions, associated with video content, with user device 210. Based on the point of sale transaction, content distribution server 220 may send encrypted and/or transcoded video content to user device 210. In another example, content distribution server 220 may, as a result of the point of sale transaction, generate a token associated with the video content and based on the information associated with the user device 210. Content distribution server 220 may send the token to user device 210 as an indication that payment information for the video content was processed via the point of sale transaction.

License server 230 may include one or more server devices, or other types of computation or communication devices, that gather, process, search, store, and/or provide information. In one example implementation, license server 230 may process requests for licenses associated with video content, received from user device 210. For example, license server 230 may receive a request for a license associated with video content that includes a token, information associated with user device 210, and/or information associated with the video content. License server 230 may use the token to verify that the video content was obtained by user device 210 as a result of a point of sale transaction regarding the video content. In another example, license server 230 may use the information, associated with the user device 210, to authenticate user device 210. In yet another example, license server 230 may use the information associated with user device 210 to verify user device 210 by communicating with content distribution server 220. Based on the authentication and/or verification, license server 230 may, for example, generate a license that authorizes user device 210 to decrypt and/or play the video content in accordance with terms of the point of sale transaction (e.g., a purchase, rent, lease, pay-per-view, etc.). License server 230 may generate a license for the video content that contains a key that enables user device 210 to process and/or play the video content. For example, the key may permit user device 210 to decrypt the video content, but may prohibit another user device 210 to decrypt the video content.

Content provider server 240 may include one or more server devices, or other types of computation or communication devices, that gather, process, search, store, and/or provide information. Content provider server 240 may interface with network 250. In one example implementation, content provider server 240 may encrypt video content (hereinafter referred to as "provider encryption") using an encryption key (e.g., a provider key). Content provider server 240 may provide a provider key and/or an identifier associated with video content (e.g., a content ID) to content distribution server 220, which may permit content distribution server 220 to decrypt and/or process video content received from content provider server 240. Additionally or alternatively, content provider server 240 may process video content so that the processed video content may be received and/or played by different types and/or brands of user devices 210. For example, content provider server 240 may transcode video content using data structures, protocols, and/or proprietary APIs that permit the different types of user devices 210 to receive, process and/or play the transcoded video content.

Network 250 may include one or more wired and/or wireless networks. For example, network 250 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 250 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Although not shown in FIG. 2, network 200 may include a variety of other devices, such as an authentication server, a self-provisioning server, etc. Each of these devices may perform certain functions described briefly below. Any of these functions may be performed by content distribution server 220, license server 230 and/or content provider server 240. Thus, one or more of these devices may be integrated into content distribution server 220, license server 230, and/or content provider server 240.

The authentication server may include one or more server devices, or other types of computation or communication devices, that authenticate user device 210 and/or license server 230. For example, the authentication server may receive a request to authenticate user device 210 based on information associated with content distribution server 220 (e.g., an identifier associated with content distribution server 220), information associated with a user of user device 210 (e.g., username, password, email address, PIN, etc.), and/or information associated with user device 210 (e.g., an identifier associated with user device 210).

The self-provisioning server may include one or more server devices, or other types of computation or communication devices that enable the registration of user device 210. The self-provisioning server may receive registration information from user device 210 and/or content distribution server 220. The self-provisioning server may facilitate sending address information, associated with content distribution server 220 and/or content provider server 240, to user device 210 and/or may forward backup preferences, associated with a user of user device 210, to license server 230.

Figure 3:
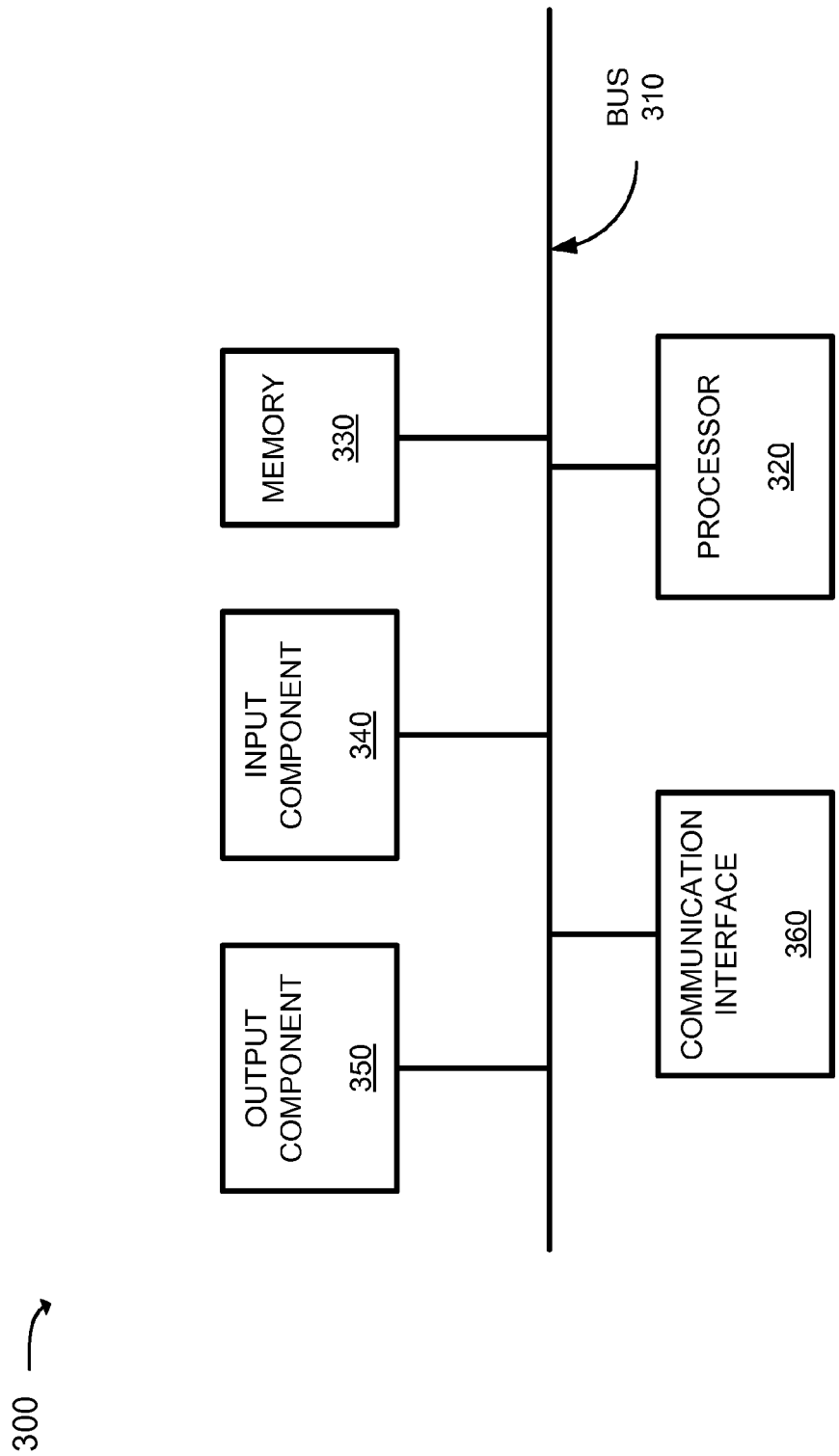
FIG. 3 is a diagram of example components of one or more of the devices of FIG. 2.

FIG. 3 is a diagram of example components of a device 300 that may correspond to content distribution server 220, license server 230, and/or content provider server 240. Device 300 may include a bus 310, a processor 320, a memory 330, an input component 340, an output component 350, and a communication interface 360. Although FIG. 3 shows example components of device 300, in other implementations, device 300 may include fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as network 250.

As will be described in detail below, device 300 may perform certain operations relating to secure video content provisioning using DRM. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause to processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
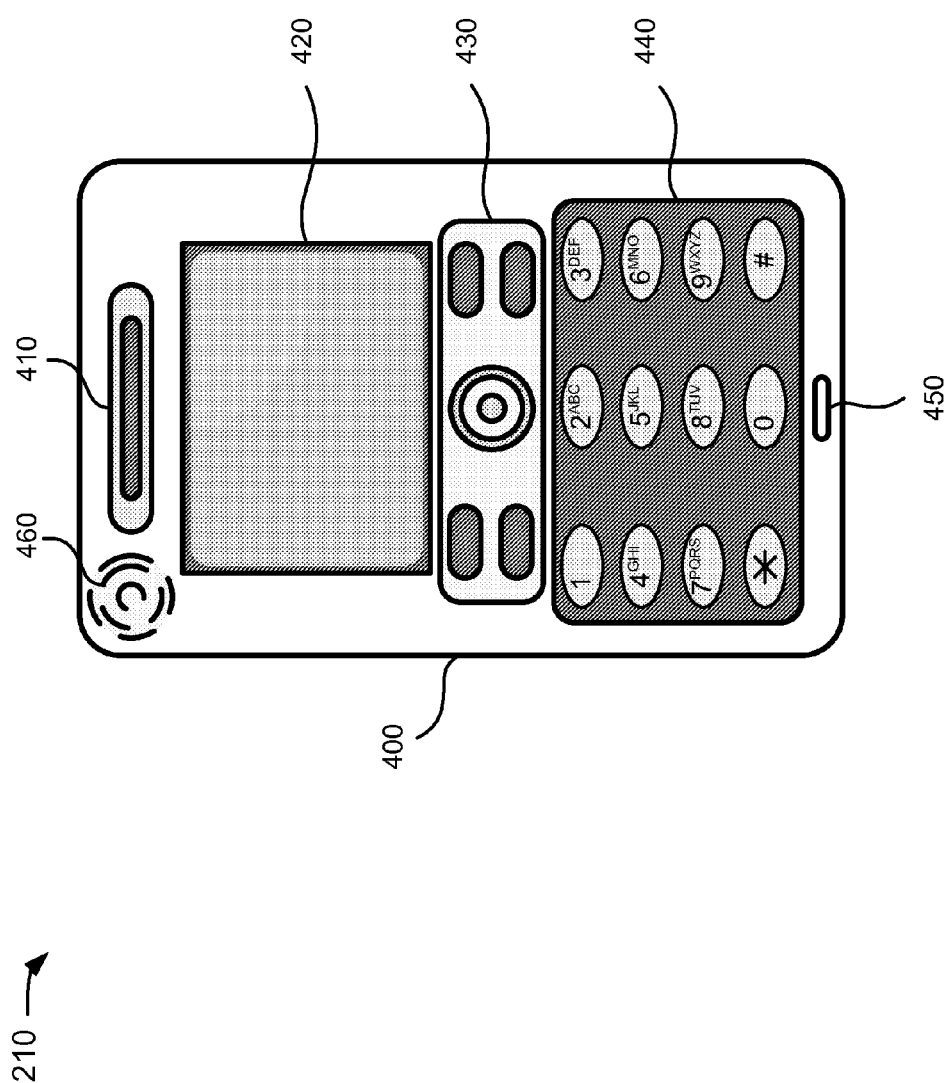
FIG. 4 is a diagram of an example user device, as shown in FIG. 2.

FIG. 4 is a diagram of an example user device 210. As shown in FIG. 4, user device 210 may include a housing 400, a speaker 410, a display 420, control buttons 430, a keypad 440, a microphone 450, and/or a camera 460. Housing 400 may include a chassis on which some or all of the components of user device 210 are mechanically secured and/or covered. Speaker 410 may include a component to receive input electrical signals from user device 210 and transmit audio output signals, which communicate audible information to a user of user device 210.

Display 420 may include a component to receive input electrical signals and present a visual output in the form of text, images, videos and/or combinations of text, images, and/or videos which communicate visual information to the user of user device 210. In one implementation, display 420 may display text input into user device 210, text, images, and/or video received from another device, and/or information regarding incoming or outgoing calls or text messages, emails, media, games, phone books, address books, the current time, etc.

Control buttons 430 may include one or more buttons that accept, as input, mechanical pressure from the user (e.g., the user presses a control button or combinations of control buttons) and send electrical signals to processor 320 that may cause user device 210 to perform one or more operations. For example, control buttons 430 may be used to cause user device 210 to transmit information. Keypad 440 may include a standard telephone keypad or another arrangement of keys.

Microphone 450 may include a component to receive audible information from the user and send, as output, an electrical signal that may be stored by user device 210, transmitted to another user device, or cause the device to perform one or more operations. Camera 460 may be provided on a back side of user device 210, and may include a component to receive, as input, analog optical signals and send, as output, a digital image or video that can be, for example, viewed on display 410, stored in the memory of user device 210, discarded and/or transmitted to another user device 210.

Although FIG. 4 depicts example components of user device 210, in other implementations, user device 210 may include fewer components, additional components, different components, or differently arranged components than illustrated in FIG. 4. In still other implementations, one or more components of user device 210 may perform one or more tasks described as being performed by one or more other components of user device 210.

Figure 5:
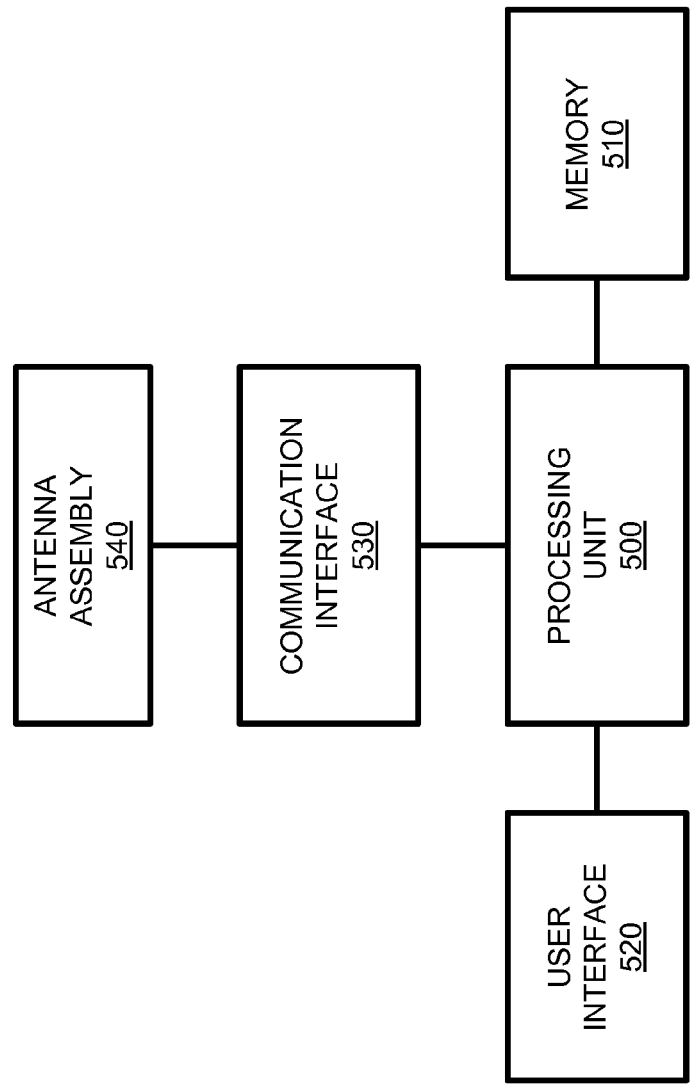
FIG. 5 is a diagram of example components of the user device of FIG. 4.

FIG. 5 is a diagram of example components of user device 210. As shown in FIG. 5, user device 210 may include a processing unit 500, a memory 510, a user interface 520, a communication interface 530, and/or an antenna assembly 540. Although FIG. 5 shows example components of user device 210, in other implementations, user device 210 may include fewer components, additional components, different components, or differently arranged components than depicted in FIG. 5. In still other implementations, one or more components of user device 210 may perform one or more tasks described as being performed by one or more other components of user device 210.

Processing unit 500 may include a processor, a microprocessor, an ASIC, a FPGA, or the like. Processing unit 500 may control operation of user device 210 and its components. In one implementation, processing unit 500 may control operation of components of user device 210 in a manner similar to that described herein. Memory 510 may include a RAM, a ROM, and/or another type of memory to store data and/or instructions that may be used by processing unit 500.

User interface 520 may include mechanisms for inputting information to user device 210 and/or for outputting information from user device 210. Examples of input and output mechanisms might include buttons (e.g., control buttons 430, keys of keypad 440, a keyboard, a joystick, etc.); a touch screen interface to permit data and control commands to be input into user device 210; a biometric device to receive fingerprints scans, retina scans, facial signatures, etc.; a speaker (e.g., speaker 410) to receive electrical signals and output audio signals; a microphone (e.g., microphone 450) to receive audio signals and output electrical signals; a display (e.g., display 420) to output visual information (e.g., user interfaces, web pages, etc.); a vibrator to cause user device 210 to vibrate; and/or a camera (e.g., camera 460) to receive video and/or images.

Communication interface 530 may include, for example, a transmitter that may convert baseband signals from processing unit 500 to radio frequency (RF) signals and/or a receiver that may convert RF signals to baseband signals. Alternatively, communication interface 530 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network (e.g., network 250).

As described in detail below, user device 210 may perform certain operations described herein in response to processing unit 500 executing software instructions of an application contained in a computer-readable medium, such as memory 510. The software instructions may be read into memory 510 from another computer-readable medium or from another device via communication interface 530. The software instructions contained in memory 510 may cause processing unit 500 to perform processes that will be described later. Alternatively, hardwired circuitry may be used in place of or in combination with software instructions to implement processes described herein. Thus, implementations described herein are not limited to any specific combination of hardware circuitry and software.

Figure 6:
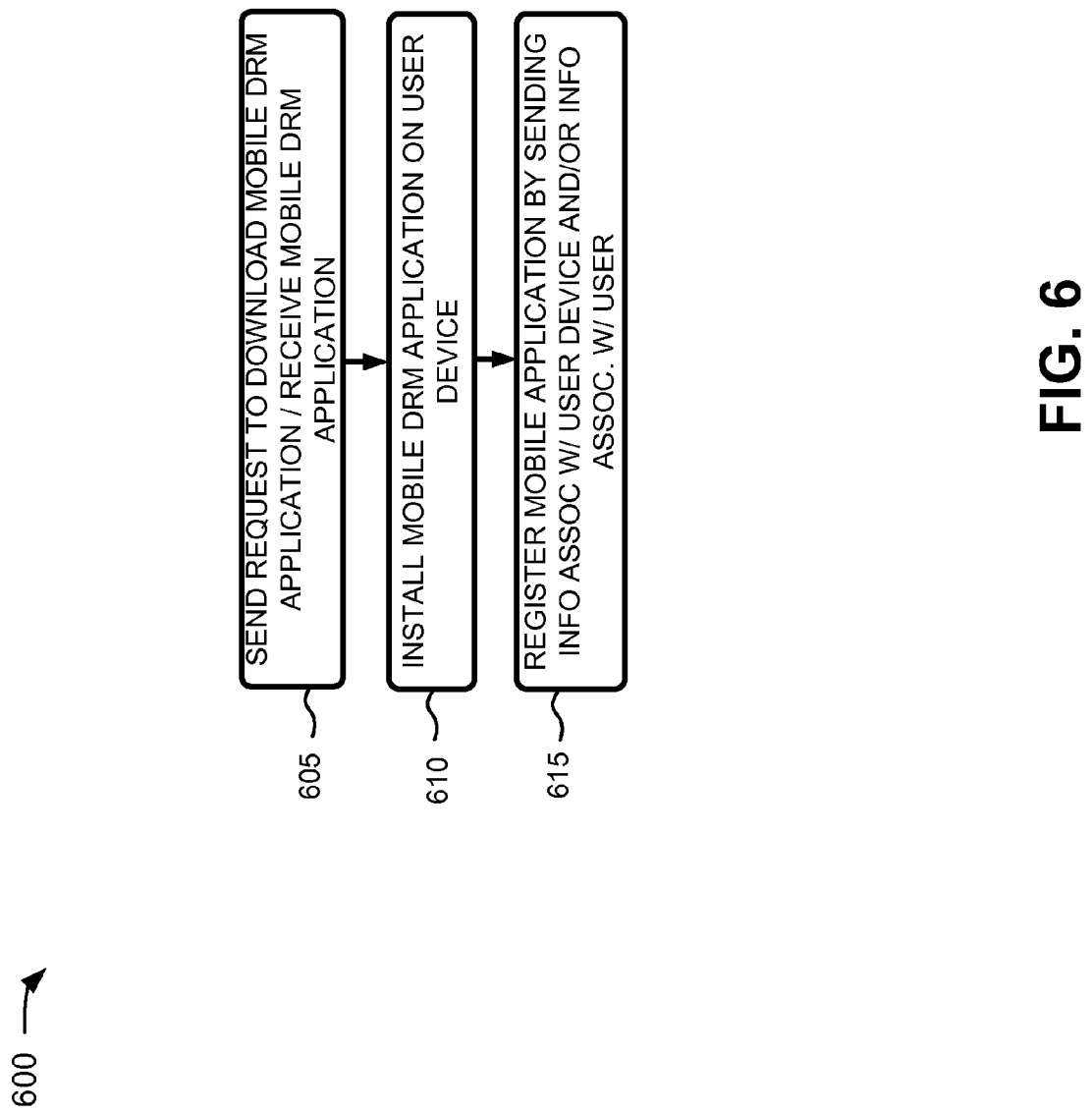
FIG. 6 is a flow chart of an example process for downloading and/or installing a mobile digital rights management application on a user device.

FIG. 6 is a flow chart of an example process 600 for downloading and/or installing a mobile DRM application on user device 210. In one implementation, process 600 may be performed by user device 210 and/or content distribution server 220. In another implementation, some or all of process 600 may be performed by a device or collection of devices separate from, or in combination with, user device 210 and/or content distribution server 220.

As shown in FIG. 6, process 600 may include sending a request to download a mobile DRM application and receiving the mobile DRM application (block 605). For example, a user, of user device 210, may desire to receive and/or play or view video content and may instruct user device 210 to download a mobile DRM application from content distribution server 220 and/or some other server device. The user device may, in response to the instruction, send a request to content distribution server 220 to download the mobile DRM application. Content distribution server 220 may receive the request and may send the mobile DRM application to user device 210.

As also shown in FIG. 6, process 600 may include installing a mobile DRM application on user device 210 (block 610). For example, user device 210 may install the mobile DRM application on user device 210. For example, user device 210 may store the mobile DRM application in a memory associated with user device 210. Additionally, or alternatively, the mobile DRM application may use an API or a set of APIs to communicate with user device 210 to obtain information associated with user device 210. In one example, the mobile DRM application may use an OEM API, associated with a type and/or brand of user device 210, to obtain, from user device 210, the information associated with user device 210. The information associated with the user device may include a unique address associated with user device 210 (e.g., a MAC address, an IP address, etc.) and/or a unique device identifier (e.g., a MEID, an IMEI, a MDN, an IMSI, an ESN, a UICC identifier, a MIN, a MSISDN, a NAI, a CODEC number, a STB identifier, etc.).

As further shown in FIG. 6, process 600 may include registering the mobile DRM application and/or user device 210 on which the mobile DRM application is hosted (block 615). For example, the mobile DRM application may obtain the information associated with user device 210 and may register the mobile DRM application and/or user device 210 (e.g., with content distribution server 220 and/or some other server device). In one example, the mobile DRM application may send the information associated with user device 210 to content distribution server 220. Additionally, or alternatively, the mobile DRM application may send information associated with the mobile DRM application (e.g., a unique application identifier or some other identifier) to content distribution server 220. In another example, the mobile DRM application may send information associated with a user, of user device 210, to content distribution server 220.

In another example implementation, the mobile DRM application may enable the user to specify preferences associated with using the mobile DRM application. For example, the mobile application may enable a user to enter payment information (e.g., credit card number, credit card expiration date, billing address, etc.) that may permit selected video content to be purchased, at a future point in time, using the payment information. In another example, the mobile DRM application may enable a user to identify preferred terms of a purchase or rental of video content. The terms, as specified by the user, may identify a preferred rental period (e.g., one day, one week, one month, etc.), a preferred quantity of times video content is to be displayed, a preference for purchasing or renting, etc. In yet another example, the mobile DRM application may enable a user to specify parental controls that prohibit particular video content to be received on user device 210 (e.g., no video content above a particular rating, such as a R-rating or some other rating). In still another example, the mobile DRM application may permit the user to specify preferred video content genres (e.g., drama, horror, comedy, games, etc.). The mobile DRM application may send the user preferences to content distribution server 220.

Content distribution server 220 may receive the information associated with user device 210, information associated with the mobile DRM application, information associated with the user, and/or information associated with user preferences and may store the received information in a memory associated with content distribution server 220.

Figure 7:
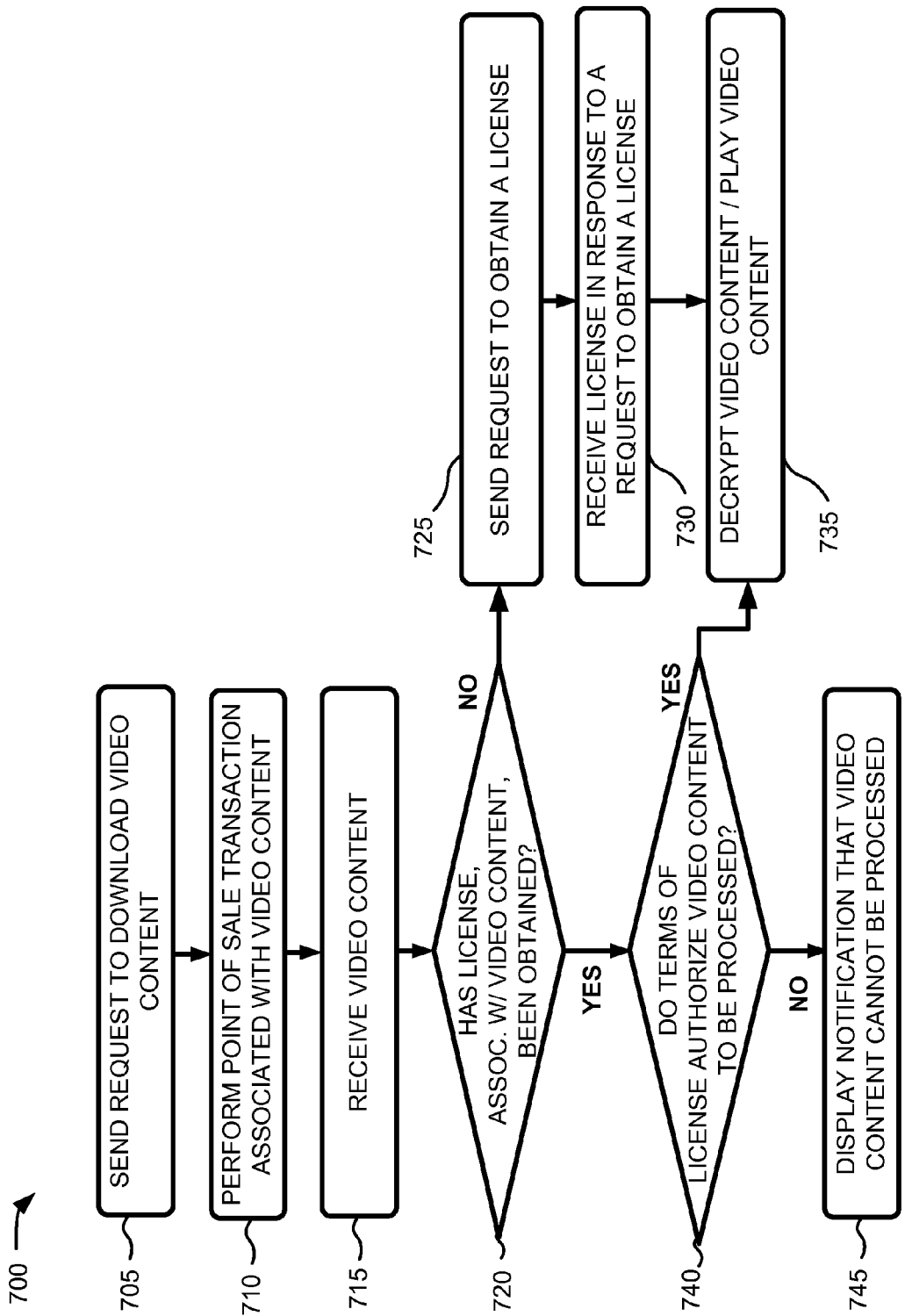
FIG. 7 is a flow chart of an example process for using a mobile digital rights management application to securely download and/or play video content on a user device.

FIG. 7 is a flow chart of an example process 700 for using a mobile DRM application to securely download and/or play video content on user device 210. In one implementation, process 700 may be performed by user device 210, content distribution server 220, and/or license server 230. In another implementation, some or all of process 700 may be performed by a device or collection of devices separate from, or in combination with, user device 210, content distribution server 220, and/or license server 230.

As shown in FIG. 7, process 700 may include sending a request to download video content (block 705). For example, a user, of user device 210, may use the mobile DRM application to view a list of video content identifiers (e.g., titles, icons, descriptions, etc.) on a video content guide user interface (UI) on user device 210. The user may select a video content identifier from the list of video content identifiers, via the video content guide UI, and user device 210 may receive the selection via the video content guide UI. The mobile DRM application may send, to content distribution server 220, a request to obtain video content that corresponds to the selection. The request may include the selected video content identifier and credentials associated with user device 210, such as information associated with user device 210 (e.g., a device identifier, a device address, etc.), information associated with the mobile device application (e.g., an application identifier, etc.), and/or information associated with the user (e.g., username, password, personal identification number, etc.). The mobile DRM application may obtain information associated with user device 210 (e.g., using an OEM API associated with user device 210), in a manner that cannot be forged, copied, changed, and/or that is not accessible by the user.

For example, content distribution server 220 may receive a request to obtain video content and may authenticate user device 210 by comparing credentials received with the request with credentials stored in a memory associated with content distribution server 220. Content distribution server 220 may deny the request to obtain video content based on a determination that the received credentials do not match the stored credentials. If, however, content distribution server 220 determines that the received credentials match the stored credentials, then content distribution server 220 may authenticate user device 210.

As also shown in FIG. 7, process 700 may include performing a point of sale transaction associated with the video content (block 710). For example, based on authentication of user device 210, content distribution server 220 may send an instruction for the user to send payment information associated with the selection. The instruction may, for example, enable the user to select and/or indicate a manner in which the user desires to obtain the video content. For example, the instruction may permit the user to identify whether the user desires to rent and/or purchase the video content. In one example, the user may indicate (e.g., via user device 210) a desire to rent the video content (e.g., for a particular period of time, for a particular quantity of viewings, etc.) and may provide payment information that corresponds with terms of the rent for the video content. In another example, the user may indicate a desire to purchase the video content and may provide payment information corresponding to the purchase. In yet another example, the user may indicate a desire to preview the video content in order to determine whether to purchase and/or rent the video content. In this example, the video content may be played by user device 210 for a particular period of time after which the mobile DRM application may instruct the user to enter payment information if the user desires to view the video content. In still another example, the user may indicate a desire to purchase a subscription for a period of time (e.g., one month, six months, one year, etc.), for a particular quantity of video content (e.g., based on a threshold specified and/or selected by the user), and/or a particular genre of video content, etc. and may provide payment information corresponding to the subscription.

Content distribution server 220 may receive the indication and/or the payment information from user device 210 and may process the payment information to determine that the payment information is valid and/or to receive payment. In one example, content distribution server 220 may compare the received payment information with stored payment information to determine whether the received payment information matches the stored payment information. In another example, content distribution server 220 may send the payment information to another network device that provides a payment processing service to determine whether the payment information is valid and/or to process payment for the video content. In yet another example, content distribution server 220 may not receive payment information and may use payment information, obtained during a registration operation, as described above (e.g., with respect to FIG. 6), to process payment for the video content.

As further shown in FIG. 7, process 700 may include receiving video content (block 715). For example, based on a determination that the payment information is valid, content distribution server 220 may communicate with content provider server 240 to obtain video content associated with the selection. The communication may include information associated with a type and/or brand of user device 210 that enables content provider server 240 to provide the video content that has been transcoded into a data structure, protocol, and/or standard that user device 210 can receive, process and/or play. Content provider server 240 may encrypt (e.g., using a provider key) the transcoded video content and/or may send the transcoded video content to content distribution server 220. Content distribution server 220 may receive the transcoded video content and may generate a token that indicates that the video content has been purchased and/or rented. Content distribution server 220 may send the transcoded video content and/or the token to user device 210 and user device 210 may receive the transcoded video content.

As yet further shown in FIG. 7, if a license, associated with video content, has not been obtained (block 720—NO), then process 700 may include sending a request to obtain the license (block 725) and receiving the license in response to the request (block 730). For example, the mobile DRM application may determine that a license, associated with the transcoded video content, is not stored in a memory associated with user device 210. Based on the determination, the mobile DRM application may send, to license server 230, a request for the license associated with the transcoded video content. The request may include a token associated with the transcoded video content, information associated with user device 210 (e.g., a device identifier, an address, etc.), and/or an identifier associated with the transcoded video content.

License server 230 may receive the request and may send the token, an identifier associated with the transcoded video content, and/or the information associated with user device 210 to content distribution server 220 to verify whether to provide and/or the terms under which a license is to be provided to user device 210.

For example, content distribution server 220 may receive the token, the identifier, and/or the information associated with user device 210 and may retrieve, from a memory associated with content distribution server 220, information associated with a prior point of sale transaction (e.g., corresponding to the token). Content distribution server 220 may determine whether the received information, associated with user device 210, matches information, associated with user device 210, obtained from the information associated with the point of sale transaction. Based on a determination that the received information, associated with user device 210, does not match the information, associated with user device 210, obtained from the information associated with the point of sale transaction, content distribution server 220 may not send a key to license server 230.

In another example, content distribution server 220 may determine that the received information, associated with user device 210, matches the information, associated with user device 210, obtained from the information associated with the point of sale transaction. Based on the determination, content distribution server 220 may identify terms by which the transcoded video content was obtained via the point of sale transaction (e.g., via a rental, a pay-per-view, a purchase, a subscription, a preview, a trial, etc). Content distribution server 220 may send, to license server 230, a key (e.g., a provider key received from content provider server 240) and/or the identified terms by which the transcoded video content was obtained.

License server 230 may receive the key and the identified terms and may send a license to user device 210. For example, license server 230 may receive the key and/or the identified terms and may generate a license, associated with the transcoded video content based on the key and the identified terms. License server 230 may send the license to user device 210 and user device 210 may receive the license.

In another example implementation, the mobile DRM application may send the request to obtain the license to license server 230 at a prior point in time. The prior point in time may, for example, be prior to the point of sale transaction to obtain the transcoded video content (e.g., as described above with respect to block 710). In yet another example implementation, the mobile DRM application may send the request, to obtain the license, to license server 230 and license server 230 may perform the point of sale transaction (e.g., using the payment information received from user device 210) in order to provide the license.

As also shown in FIG. 7, process 700 may include decrypting video content and/or playing the video content (block 735). For example, the mobile DRM application may automatically obtain a key from the license and may use the key to decrypt the transcoded video content received from content distribution server 220. The mobile DRM application may instruct user device 210 to play the decrypted video content on user device 210. In another example, the mobile DRM application may obtain the key and/or may decrypt the transcoded video content in response to a request from a user of user device 210.

In another example implementation, user device 210 may convert the received transcoded video content from a provider-encrypted format (e.g., based on a provider key associated with content provider server 240) to an OEM-encrypted format (using an OEM key associated with a type and/or brand of user device 210). For example, the mobile DRM application may decrypt the received transcoded video content using the key (e.g., a provider key) obtained from the license. The mobile DRM application may then encrypt the transcoded video content, using the OEM key, in order to play the video content on user device 210.

As further shown in FIG. 7, if a license, associated with video content, has been obtained (block 720—YES), and if terms of the license do not authorize the video content to be processed (block 740—NO), then process 700 may include sending a notification that the video content cannot be processed (block 745). For example, the mobile DRM application may retrieve a license associated with the transcoded video content from a memory associated with user device 210. The license may include information associated with terms of the license by which the transcoded video content may be processed (e.g., decrypted, encrypted, etc.) and/or played by user device 210. For example, the mobile DRM application may determine, from the information associated with the terms of the license, that a rental period, a subscription period, and/or a preview period, associated with the transcoded video content, has expired. In another example, the mobile DRM application may determine that a quantity of times that the transcoded video content has been processed and/or played, by user device 210, exceeds a threshold identified in the information associated with the terms of the license. In still another example, the mobile DRM application may determine that a trial period, associated with the transcoded video content, has expired. Based on the determination that the mobile DRM application may present a notification for display on user device 210 that indicates that the transcoded video content cannot be played. In another example, the notification may instruct the user to renew the license by entering payment information and/or by selecting a button on a user interface via which the notification is displayed.

As yet further shown in FIG. 7, if a license, associated with video content, has been obtained (block 720—YES), and if terms of the license authorize the video content to be processed (block 740—YES), then process 700 may include decrypting the video content and/or playing the video content (block 735). For example, the mobile DRM application may retrieve a license associated with the transcoded video content from a memory associated with user device 210. The license may include information associated with terms of the license by which the transcoded video content may be processed (e.g., decrypted, encrypted, etc.) and/or played by user device 210. For example, the mobile DRM application may determine, from the information associated with the terms of the license, that a rental period, a subscription period, and/or a preview period, associated with the transcoded video content, has not expired. In another example, the mobile DRM application may determine that a quantity of times that the transcoded video content has been processed and/or played, by user device 210, is less than a threshold identified in the information associated with the terms of the license. In still another example, the mobile DRM application may determine that a trial period, associated with the transcoded video content, has not expired. Based on the determination, the mobile DRM application may use the key, obtained from the license, to decrypt the video content and/or play the transcoded video content in a manner similar to that described above (e.g., with respect to block 735).

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    sending, by a user device, a request to a content server to download a mobile digital rights management (DRM) application including a plurality of original equipment manufacturer (OEM) application program interfaces (APIs), corresponding to types or brands of user devices, wherein the OEM APIs prevent an identifier associated with each of the user devices from being accessed or changed by users of the user devices;
    receiving, from the content server responsive to the request, the mobile DRM application and storing the mobile DRM application in a memory associated with the user device;
    sending, to the content server to perform registration of the mobile DRM application, an identifier associated with the user device and payment information indicative of user-preferred terms of purchase or rental of selected video content corresponding to future point of sale transactions;
    receiving, by the user device, a first request to view video content from a user of the user device;
    retrieving, from the memory and in response to the request, the identifier associated with the user device using the OEM API associated with the type or the brand of the user device;
    sending, to the content server and by the user device, a second request to receive the video content, the second request including the identifier associated with the user device and the payment information indicative of the user-preferred terms of the purchase or rental of the video content;
    receiving, from the content server and by the user device, the video content and a token, wherein the video content is encrypted based on an encryption key and wherein the token indicates that the payment information, associated with the registration of the mobile DRM application, has been used to process payment associated with the purchase or rental of the video content;
    sending, to a license server and by the user device, a third request to obtain a license associated with the video content, the third request including the token and the identifier associated with the user device;
    receiving, from the license server and by the user device, the license associated with the video content, the license including the encryption key and information associated with terms under which the video content is to be processed by, or played on, the user device;
    decrypting, by the user device, the video content using the encryption key, wherein decrypting the video content is performed in a manner permitted by the terms under which the video content is to be processed by, or played on, the user device;
    retrieving, from the memory, an OEM key associated with the type or the brand of the user device;
    re-encrypting, using the OEM key, the decrypted video content to create OEM-encrypted video content; and
    playing, by the user device, the OEM-encrypted video content.

2. The method of claim 1, further comprising:
    determining that the information, associated with terms under which the video content is to be processed by the user device, indicates that the video content was rented for a period of time; and
    determining that the period of time has not expired.

3. The method of claim 1, further comprising:
    determining that the information, associated with terms under which other video content is to be processed by the user device, indicates that the other video content was rented in a manner that permits the other video content to played a particular quantity of times;
    determining that the quantity of times that the other video content has been played is greater than the particular quantity of times; and
    sending a notification that playing the other video content is not permitted.

4. The method of claim 1, further comprising:
    receiving, from the content server, other video content, where the other video content is encrypted based on another encryption key;
    determining that another license, associated with the other video content, was obtained at a prior point in time;
    decrypting the other video content using the other encryption key obtained from the other license; and
    playing the decrypted other video content on the user device.

5. The method of claim 1, further comprising:
    sending, to the license server, a fourth request to receive another license associated with other video content, the fourth request including another identifier associated with the other video content and the identifier associated with the user device;
    receiving, from the license server, the other license associated with the other video content, where the other license includes another encryption key;
    purchasing, from the content server, the other video content, where the purchasing includes sending payment information associated with the purchase;
    receiving, from the content server, the other video content, where the other video content is encrypted based on the other encryption key;
    decrypting the other video content using the other encryption key; and
    playing the decrypted other video content on the user device.

6. The method of claim 1, wherein the identifier associated with the user device comprises a media access control (MAC) address, an IP address, a uniform resource locator (URL), a mobile equipment identifier (MEID), an international mobile equipment identifier (IMEI), a mobile directory number (MDN), an international mobile subscriber identity (IMSI), an electronic serial number (ESN), a universal integrated circuit card (UICC) identifier, a mobile identification number (MIN), a mobile subscriber integrated services digital network (MSISDN) number, a national access identifier (NAI), an encoder-decoder (CODEC) number, or a set-top box identifier.

7. The method of claim 1, further comprising:
sending, to the content server to perform registration of the mobile DRM application, first information associated with the mobile DRM application and information associated with the user.

8. The method of claim 1, wherein sending the second request further comprises:
sending, to the content server, first information associated with the mobile DRM application and information associated with the user.

9. A user device, comprising:
a memory to store a mobile digital rights management (DRM) application that permits selected video content to be downloaded, processed, or played by the user device in a manner that does not permit the selected video content to be copied or played on another user device; and
a processor to:
send a request to a first server to receive the mobile DRM application;
receive, responsive to the request, the mobile DRM application from the first server, wherein the mobile DRM includes a plurality of original equipment manufacturer (OEM) application program interfaces (APIs), corresponding to types or brands of user devices, which prevent an identifier associated with each of the user devices from being accessed or changed by users of the user devices,
perform a registration operation with respect to the mobile DRM application, wherein the registration operation includes providing to the first server, payment information indicative of user-preferred terms of purchase or rental of video content corresponding to future point of sale transactions,
receive selection of video content, by a user, from a list of video content that is displayed on the user device by the mobile DRM application,
send, to the first server, a request to receive the selected video content based on the payment information associated with the registration operation,
perform, via the first server, a point of sale transaction, corresponding to the payment information associated with the registration operation, to obtain the selected video content,
receive the selected video content and a token, wherein the token indicates that the selected video content was obtained via the point of sale transaction,
retrieve, from the memory, the identifier associated with the user device using the OEM API associated with the type or the brand of the user device,
send, to a second server, a request for one or more licenses corresponding to the selected video content, the request for the one or more licenses including the token and the identifier associated with the user device,
receive, from the second server, the one or more licenses, wherein each of the one or more licenses correspond to a respective different one of the selected video content,
determine whether particular video content, of the selected video content, is to be processed based on terms of the point of sale transaction obtained from a particular license, of the one or more licenses, that corresponds to the particular video content,
decrypt the particular video content using a key, obtained from the particular license, based on a determination that the particular video content is to be processed,
retrieve, from the memory, an OEM key associated with the type or the brand of the user device;
re-encrypt, using the OEM key, the decrypted particular video content to create OEM-encrypted video content; and
play the OEM-encrypted video content on the user device.

10. The user device of claim 9, where the selected video content, received from the first server, is received in a transcoded format, associated with a type or a brand of the user device, that enables the user device to receive or process the selected video content.

11. The user device of claim 9, where the processor is further to:
determine that the terms of the point of sale transaction indicate that the particular video content was obtained via a subscription for the selected video content, where the subscription identifies a preferred genre, specified by the user at a prior point in time, for the selected video content, and
process the particular video content based on the determination that the particular video content was obtained via the subscription.

12. The user device of claim 9, where the processor is further to:
determine that the terms of another point of sale transaction indicate that another video content, of the selected video content, is to be played, by the user device, for a period of time, where the period of time permits the user to preview the other video content,
play the other video content for the period of time based on the determination that the terms of the other point of sale transaction indicate that the other video content is to be played for the period of time, and
instruct, after the period of time, the user to provide payment information in order for the user device to continue playing the other video content.

13. The user device of claim 9, where the processor is further to:
receive, from the first server, another video content, of the selected video content, where the other video content is encrypted based on another key,
determine that another license, associated with the other video content, was obtained at a prior point in time,
decrypt the other video content using the other key obtained from the other license, and
play the decrypted other video content on the user device.

14. The user device of claim 9, wherein, when receiving the selected video content, from the list of video content, the processor is further to:
receive, from the user, a request to view a plurality of video content identifiers,
retrieve, from the memory, parental controls specified by the user during the registration operation, and
present the list of video content, of the plurality of video content identifiers, on a display associated with the user device based on the parental controls.

15. The user device of claim 9, wherein the identifier associated with the user device comprises a media access control (MAC) address, an IP address, a uniform resource locator (URL), a mobile equipment identifier (MEID), an international mobile equipment identifier (IMEI), a mobile directory number (MDN), an international mobile subscriber identity (IMSI), an electronic serial number (ESN), a universal integrated circuit card (UICC) identifier, a mobile identification number (MIN), a mobile subscriber integrated services digital network (MSISDN) number, a national access identifier (NAI), an encoder-decoder (CODEC) number, or a set-top box identifier.

16. The user device of claim 9, wherein, when sending a request to the first server to receive the mobile DRM application, the processor is further configured to send first information associated with the mobile DRM application and information associated with the user.

17. The user device of claim 9, wherein, when sending a request to the first server to receive the selected video, the processor is further configured to send first information associated with the mobile DRM application and information associated with the user.

18. A user device, comprising:
  a memory to store video content and a license associated with the video content, the license including a key to be used to decrypt the stored video content and license terms by which the stored video content may be processed by or played on the user device; and
  a processor to:
    install, in the memory, a mobile digital rights management (DRM) application, including a plurality of original equipment manufacturer (OEM) application program interfaces (APIs), corresponding to types or brands of user devices, wherein the OEM APIs prevent an identifier associated with each of the user devices from being accessed or changed by users of the user devices,
    register the mobile DRM application by providing the identifier associated with the user device and payment information indicative of user-preferred terms of purchase or rental of selected video content corresponding to point of sale transactions,
    receive an instruction from a user, of the user device, to play the video content,
    determine, in response to the instruction, that the license terms do not permit the video content to be processed by, or played on, the user device,
    send, to a first server device, a first request to renew the license, associated with the video content, based on the determination that the license terms do not permit the video content to be processed by, or played on, the user device, wherein the first request includes the identifier associated with the user device and the payment information indicative of the preferred terms of the purchase or rental of the video content,
    receive, from the first server device, a renewed license associated with the video content, wherein the renewed license includes the key and renewed license terms by which the video content is to be processed by, or played on, the user device,
    decrypt the video content using the key, obtained from the renewed license,
    retrieve, from the memory, an OEM key associated with the type or the brand of the user device;
    re-encrypt, using the OEM key, the decrypted video content to create OEM-encrypted video content; and
    play the OEM-encrypted video content on the user device.

19. The user device of claim 18, wherein the processor is further to:
  send, at a prior point in time relative to the instruction received from the user, a second request to a second server device to download the mobile DRM application,
  receive, from the second server device, the mobile DRM application in response to the second request, and
  register the mobile DRM application via the second server.

20. The user device of claim 18, where, when sending the first request to renew the license, the processor is further to:
  retrieve, from the memory, the identifier associated with the user device using the OEM API associated with the user device.

21. The user device of claim 18, where the processor is further to:
  receive another instruction from the user to play other video content,
  determine, in response to the other instruction, that license terms, associated with the other video content, permit the other video content to be processed by, or played on, the user device,
  decrypt the other video content using another key, obtained from another license associated with the other video content, based on the determination that the license terms, associated with the other video content, permit the video content to be processed by, or played on, the user device, and
  play the decrypted other video content on the user device.

22. The user device of claim 18, wherein the identifier associated with the user device comprises a media access control (MAC) address, an IP address, a uniform resource locator (URL), a mobile equipment identifier (MEID), an international mobile equipment identifier (IMEI), a mobile directory number (MDN), an international mobile subscriber identity (IMSI), an electronic serial number (ESN), a universal integrated circuit card (UICC) identifier, a mobile identification number (MIN), a mobile subscriber integrated services digital network (MSISDN) number, a national access identifier (NAI), an encoder-decoder (CODEC) number, or a set-top box identifier.

23. The user device of claim 18, wherein, when registering the mobile DRM application, the processor is further configured to provide first information associated with the mobile DRM application and information associated with the user.

24. The user device of claim 18, wherein in the first request further includes first information associated with the mobile DRM application and information associated with the user.

* * * * *